Figures 1, 2:
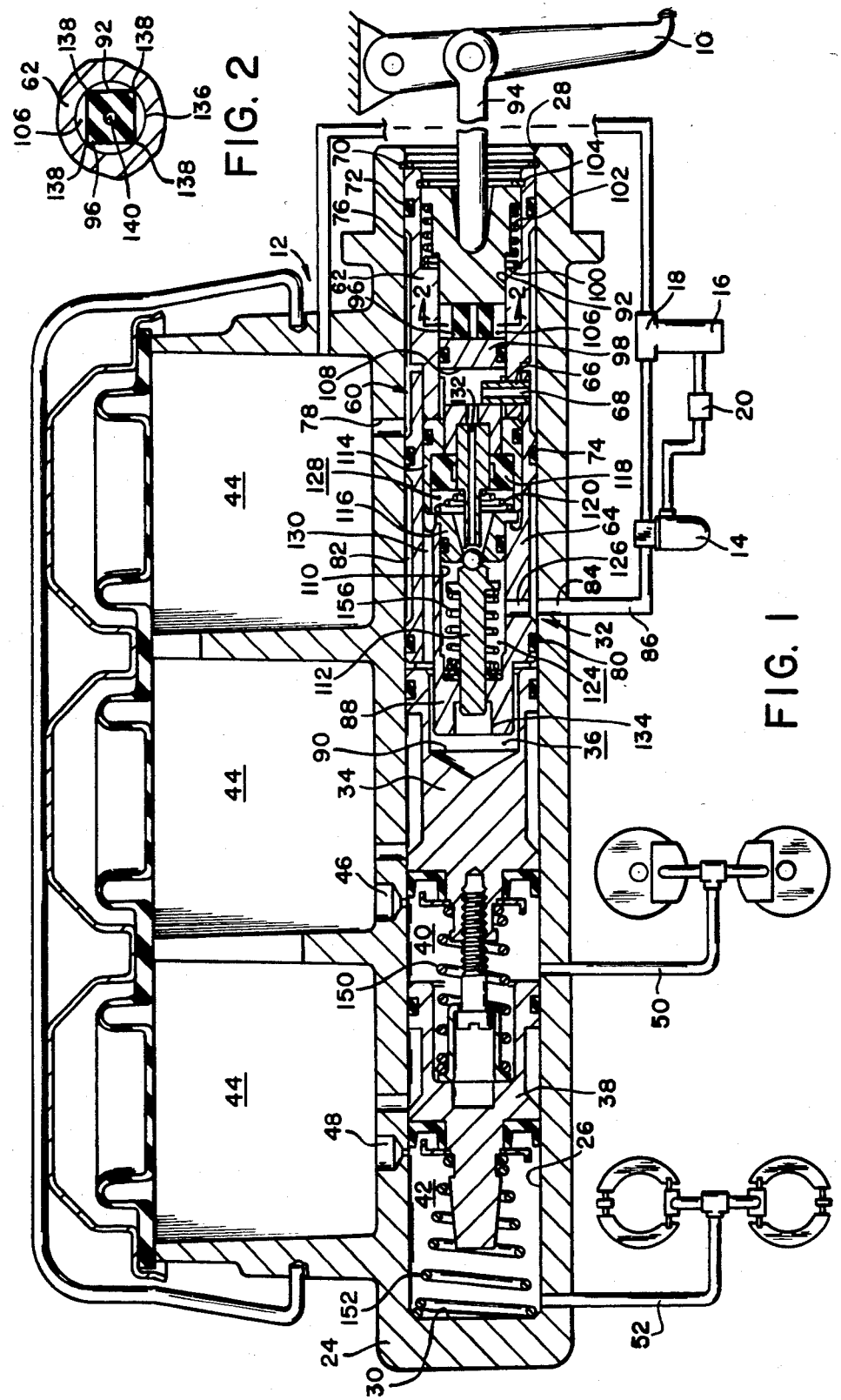

United States Patent [19]  
Fulmer

[11] Patent Number: 4,490,977  
[45] Date of Patent: Jan. 1, 1985

[54] HYDRAULIC BRAKE BOOSTER
[75] Inventor: Keith H. Fulmer, Mishawaka, Ind.
[73] Assignee: The Bendix Corporation, Southfield, Mich.
[21] Appl. No.: 544,926
[22] Filed: Oct. 24, 1983

Related U.S. Application Data

[63] Continuation of Ser. No. 264,511, May 18, 1981, abandoned.
[51] Int. Cl.³ .............................................. B60T 13/00
[52] U.S. Cl. ............................ 60/547.1; 60/554; 60/582; 91/369 A
[58] Field of Search .............. 60/547.1, 548, 554, 60/582, 562; 91/370, 371, 372, 373, 434, 369 A

[56] References Cited

U.S. PATENT DOCUMENTS

| | | | |
|---|---|---|---|
| 2,410,269 | 12/1946 | Heuings . | |
| 3,054,387 | 9/1962 | Kellogg | 91/373 |
| 3,074,383 | 1/1963 | Schultz . | |
| 3,183,670 | 5/1965 | Schultz . | |
| 3,302,481 | 2/1967 | Kenrick | 74/512 |
| 3,306,043 | 2/1967 | Kellogg | 60/548 |
| 3,714,869 | 2/1973 | Flory | 91/434 |
| 3,747,473 | 7/1973 | Bach | 91/373 |
| 3,851,473 | 12/1974 | Bainbridge | 91/372 |
| 4,075,848 | 2/1978 | Ueda | 91/370 |
| 4,126,996 | 11/1978 | Leiber | 60/547.1 |
| 4,214,448 | 7/1980 | Belart | 60/547.1 |
| 4,283,994 | 8/1981 | Belart | 60/547.1 |
| 4,326,379 | 4/1982 | Dauvergne | 60/554 |
| 4,341,076 | 7/1982 | Steffes | 60/547.1 |

Primary Examiner—Abraham Hershkovitz  
Attorney, Agent, or Firm—Paul David Schoenle; Ken C. Decker

[57] ABSTRACT

A hydraulic brake booster includes a housing with a bore for receiving a first piston, a second piston and a valve assembly. The valve assembly includes a sleeve with a bore receiving a first valve member and a second valve member. The valve member cooperates with an input member to define a cavity within the sleeve and a resilient travel block is disposed within the cavity in engagement with the valve member and the input member.

8 Claims, 2 Drawing Figures

U.S. Patent  Jan. 1, 1985  4,490,977

HYDRAULIC BRAKE BOOSTER

This is a continuation of application Ser. No. 264,511, filed May 18, 1981, now abandoned.

This invention relates to a hydraulic brake booster which is incorporated into a vehicle brake system to provide a power assist during a brake application. More particularly the invention relates to a booster commonly referred to in the state of the art as a "full power" brake booster.

In a full power brake booster an accumulator is charged with fluid pressure for selective use in providing a power assist. The accumulator is communicated to a booster housing and a valve assembly is operable to control communication of fluid pressure from the accumulator to a power chamber wherein the fluid pressure acts against at least one piston to communicate fluid from the housing to a brake circuit. The valve assembly is enclosed within a sleeve and an input member is movable relative to the sleeve to control operation of the valve assembly.

In order to provide pedal travel for a full power brake booster, it has been proposed to provide a lost motion connection between the input member and the pedal assembly. The lost motion connection requires modification of the pedal assembly or the input member to accomodate or carry a resilient member therebetween.

The present invention covers an improvement for a full power brake booster wherein pedal travel is required. The present invention provides a hydraulic brake booster, an accumulator for storing fluid pressure which is used selectively during braking to provide a power assist, a booster housing forming a bore communicating with the accumulator, a pair of pistons movable within the bore to communicate fluid from the bore to respective brake circuits during braking, a sleeve assembly disposed within the bore and cooperating with one of the pistons to form a power chamber, the sleeve assembly carrying a pair of valve members, one of which normally closes communication between the power chamber and the accumulator and the other normally vents the power chamber to a reservoir, and an input member cooperating with the pair of valve members to move the latter during braking such that the one valve member communicates the accumulator with the power chamber and the other valve member closes communication between the power chamber and the reservoir, characterized by said input member cooperating with said pair of valve members by means of resilient block, said other valve member sealingly engaging the sleeve assembly and cooperating with the input member to substantially form a cavity within the sleeve assembly in fluid isolation from the power chambers, said resilient block being disposed within said cavity to partially fill the latter, said resilient block being deformable to permit said input member to move relative to said other valve member.

It is an advantage of the present invention that a sleeve assembly carries a pair of valve members and a resilient block so that these parts are compactly arranged within the sleeve assembly.

In FIG. 1 a brake system with a full power hydraulic brake booster is shown in cross section.

FIG. 2 is a view taken along line 2—2 of FIG. 1.

The brake system in FIG. 1 includes a brake pedal 10 which is coupled to a brake booster 12. An accumulator 14 is charged with fluid pressure by an electric motor 16 driving a pump 18. In order to maintain the fluid pressure within the accumulator 14 above a predetermined pressure level, an electronic control unit 20 with a pressure sensitive switch is provided between the accumulator 14 and the electric motor 16 to control operation of the motor 16 and pump 18.

The brake booster 12 provides a housing 24 defining a uniform diameter bore 26 extending from an opening 28 at one end of the housing 24 to an end wall 30 at the other end of the housing 24. A valve assembly 32 is disposed at the one end of the housing in the bore 26. A first piston 34 is disposed within the bore 26 and cooperates with the valve assembly 32 to form a power chamber 36. A second piston 38 cooperates with the first piston 34 to form a first pressure chamber 40 and also cooperates with the end wall 30 to form a second pressure chamber 42. The housing 24 defines a reservoir 44 which communicates fluid via compensation ports 46 and 48 with chambers 40 and 42, respectively. Fluid communicated from the reservoir to the chambers 40 and 42 is pressurized during braking, in a manner to be described hereinafter, to communicate fluid pressure to respective brake circuits 50 and 52.

The valve assembly 32 includes an outer two part sleeve 60 having a first cylinder 62 and a second cylinder 64. The cylinders 62 and 64 are secured together by a roll pin 66 with an aperture 68 extending radially therethrough. The cylinder 62 abuts a snap ring 70 fixedly disposed at the opening 28. The cylinder 62 carries a seal 72 adjacent the snap ring 70 and the cylinder 64 carries a seal 74 adjacent the cylinder 62 in order to sealingly define a return chamber 76 leading to the reservoir 44 via an opening 78 in the housing 24. The aperture 68 on the roll pin opens to the return chamber 76. The cylinder 64 also carries a seal 80 adjacent the first cylinder 34 to cooperate with seal 74 to form an inlet chamber 82. The inlet chamber 82 communicates via a port 84 on the housing 24 and a conduit 86 with the accumulator 14. The end 88 of the cylinder 64 opposite cylinder 62 is provided with a reduced diameter section to the left of seal 80. The reduced diameter section 88 extends into a recess 90 formed on the right end of the first piston 34 in order to compactly arrange the cylinder 64 adjacent the first piston 34.

The first cylinder 62 forms a stepped bore 92 to movably receive an input member 94, a resilient travel block 96 and a valve member 98. The stepped bore 92 defines a shoulder 100 and a spring 102 abuts the shoulder 100 to bias the input member 94 against a snap ring 104 fixedly carried within the first cylinder bore 92. The input member 94 and the valve member 98 form a cavity 106 within the bore 92 to receive the resilient travel block 96. The valve member 98 forms a slot 108 receiving the roll pin 66. The slot 108 is larger in an axial dimension than the roll pin 66 so that the valve member 98 is movable to a limited degree relative to the first and second cylinders. The second cylinder 64 forms a stepped bore 110 receiving the left end of the first cylinder 62. Another valve member 112 is movably disposed within the bore 110 coaxial with the valve member 98. The first cylinder 62 extends into the bore 110 to abut a spacer 114 which in turn engages a valve seat 116. The valve member 98 carries a reaction disc 118 within the spacer 114 and a spring 120 biases the valve member 98 to a rest position spaced from valve member 112 and in abutment with the roll pin 66. A spring 156 biases the valve member 112 into seating engagement with the valve seat 116 so that a chamber 124 in communication with the inlet chamber 82, via a radial opening 126, is closed to a chamber 128 in communication with the power chamber 36 via an axially extending passage 130 formed by the second cylinder 64. The valve member 98 forms a passage 132 which is normally in communication with the chambers 128 and 36 so that these chambers are in communication with the reservoir via slot 108, aperture 68, chamber 76 and opening 78. The end 88 of the second cylinder 64 forms an opening 134 for movably receiving the valve member 112 so that the latter is exposed to the power chamber 36.

In FIG. 2 the cavity 106 within the first cylinder 62 forms a circular wall 136. The resilient travel block 96 is rectangular with a plurality of edges 138 forming a line to line contact with the circular wall 136. The resilient travel block 96 is also provided with an axially extending opening 140 which is designed to provide a predetermined amount of travel between the input member 94 and the valve member 98 before the input member imparts movement to the valve member 98 against the force of spring 120.

The brake booster 12 is shown in FIG. 1 in the rest position. When a vehicle operator steps on the pedal 10, the input member 94 will move initially to the left to deform the resilient travel block 96 within the cavity 106. The resilient travel block deforms to permit a predetermined amount of travel between the input member 94 and the valve member 98. Thereafter, the valve member 98 is moved within the sleeve 60 to abut the valve member 98 with the valve member 112. The passage 132 is closed and the valve member 98 passes through the valve seat 116 to separate the valve member 112 therefrom. The valve member 98 forms a clearance with valve seat 116 so that fluid pressure within the accumulator 14, chamber 82 and chamber 124 will be communicated into the chamber 128, through the passages 130 and into the power chamber 36. The fluid pressure in the power chamber 36 acts against the first piston 34 to move the latter to the left to close compensation port 46 and communicate fluid pressure from pressure chamber 40 to brake circuit 50. In a similar manner, the moving piston 34 biases the second piston 38 to move to the left as a result of the pressure buildup in chamber 40 and the contraction of spring 150. Consequently, movement of the second piston 38 contracts spring 152 and closes the compensation port 48 to communicate fluid pressure from the chamber 42 to the brake circuit 52.

With the valve member 98 engaging the valve member 112 to communicate fluid pressure to the chambers 36 and 128, the fluid pressure acts against the left end of the valve member 112 and also against the reaction disc 118 to oppose movement of the input member and provide the vehicle operator with pedal feel or resistance during braking.

Upon termination of braking, the pedal 10 is returned to its rest position and the spring 102 biases the input member 94 to return to the position shown in FIG. 1. Meanwhile, the spring 156 biases the valve member 112 to return to seat 116. Spring 120 then biases the valve member 98 to return to the rest position shown so that the valve member 98 is then separated from seat 116. This separation opens passage 132 to the chamber 128 while at the same time the valve member 112 engages the valve seat 116 to close the chamber 124 from the chamber 128. Therefore, the power chamber 36 is communicated to the reservoir 44 via passage 130, chamber 128, passage 132, slot 108, aperture 68, return chamber 76 and opening 78. The springs 150 and 152 cooperate to move the first piston 34 and the second piston 38 to their rest positions as shown in FIG. 1.

Many variations of the invention described herein are feasible by one skilled in the art and, as such, are intended to fall within the scope of the appended claims.

I claim:

1. A hydraulic brake booster comprising a housing defining a bore communicating with a fluid reservoir, a valve assembly disposed within the bore, the bore also communicating with a source of fluid pressure and the valve assembly being operable to control communication of fluid pressure from the fluid pressure source through the housing bore, a first piston cooperating with the valve assembly to define a power chamber within the bore for receiving fluid pressure from the fluid pressure source when the valve assembly is operated, a second piston cooperating with the first piston to define a first pressure chamber within the bore communicating with a first brake circuit, the second piston also cooperating with the housing to define a second pressure chamber within the bore communicating with a second brake circuit, the valve assembly comprising sleeve means sealingly engaging the wall of the housing bore and substantially defining a bore therein, a first valve member cooperating with the sleeve means to seal the power chamber from the fluid pressure source in a rest mode, a second valve member cooperating with the sleeve means to communicate the power chamber with the fluid reservoir in the rest mode, the first valve member cooperating with the second valve member in an apply mode during braking to close communication between the power chamber and the fluid reservoir and also to open communication between the power chamber and the fluid pressure source, the second valve member carrying a reaction disc which is exposed to the fluid pressure from the fluid pressure source in the apply mode, an input member extending into the sleeve means bore at one end thereof and cooperating with the second valve member to define a cavity within the sleeve means bore, and a resilient block disposed within the cavity, the resilient block being engageable with the input member and the second valve member to provide for limited movement between the input member and the second valve member when braking is initiated, the sleeve means comprising a first cylinder at an open end of the bore and a second cylinder fastened to the first cylinder, the first and second cylinders sealingly engaging a wall of the bore, the second valve member sealingly engaging the first cylinder and cooperating with the input member to substantially define the cavity within the first cylinder, the second valve member cooperating with the first cylinder and the second cylinder to define a fluid path normally communicating the power chamber to the fluid reservoir in the rest mode, and the second valve member extending into the second cylinder to oppose the first valve member.

2. The hydraulic brake booster of claim 1 in which the second valve member forms a passage communicating with the power chamber in the rest mode via another passage defined by said second cylinder, the sleeve means carrying a pin member fastening the first and second cylinders together, the pin member extending into the second valve member passage to limit relative movement between the second valve member and the sleeve means, and the pin member comprising a cylinder with a bore to maintain communication between the fluid reservoir and the second valve member passage.

3. The hydraulic brake booster of claim 1 in which the resilient block is substantially rectangular in cross-section with edges engaging the wall of the sleeve bore to suspend the resilient block within the cavity and the resilient block is provided with a longitudinally extending opening to control deformation thereof.

4. In a hydraulic brake booster, an accumulator for storing fluid pressure which is used selectively during braking to provide a power assist, a booster housing forming a bore communicating with the accumulator, a pair of pistons movable within the bore to communicate fluid from the bore to respective brake circuits during braking, a sleeve assembly disposed within the bore and cooperating with one of the pistons to form a power chamber, the sleeve assembly carrying a pair of valve members, one of which normally closes communication between the power chamber and the accumulator and the other normally vents the power chamber to a reservoir, and an input member cooperating with the pair of valve members to move the latter during braking such that the one valve member communicates the accumulator with the power chamber and the other valve member closes communication between the power chamber and the reservoir, characterized by said input member cooperating with said pair of valve members by means of a resilient block, said other valve member sealingly engaging the sleeve assembly and cooperating with the input member to substantially form a cavity within the sleeve assembly in fluid isolation from the power chamber, said resilient block being disposed within said cavity to partially fill the latter, said resilient block being deformable to permit said input member to move relative to said other valve member, said sleeve assembly including a first cylinder with a bore having a wall sealingly receiving said other valve member and surrounding the cavity, a second cylinder coupled to said first cylinder, said second cylinder defining a stepped bore to movably carry said one valve member and receive said other valve member, said first and second cylinders sealingly engaging a wall of said housing bore, and a spacer disposed within said second cylinder, said other valve member extending through said spacer to oppose said one valve member, and said first cylinder extending into said second cylinder stepped bore to abut said spacer to retain the latter within said second cylinder.

5. The hydraulic brake booster of claim 4 in which said spacer cooperates with said other valve member to carry a reaction disc therebetween in communication with the power chamber.

6. The hydraulic brake booster of claim 4 in which said first cylinder is coupled to said second cylinder via fastening means and said fastening means cooperates with said other valve member to limit movement of the latter relative to said first and second cylinders.

7. The hydraulic brake booster of claim 6 in which said fastening means cooperates with said first and second cylinders to define a fluid path leading to a portion of said housing bore in communication with said fluid reservoir.

8. The hydraulic brake booster of claim 4 in which the housing bore is uniform in diameter and said first cylinder and said second cylinder define equal outer dimensions sealingly cooperating with the uniform diameter bore.

* * * * *